Patented Feb. 25, 1947

2,416,624

UNITED STATES PATENT OFFICE 2,416,624

STABILIZATION OF CYANHYDRINS

Virgil L. Hansley, Niagara Falls, N. Y., assignor to E. I. du Pont de Nemours and Company, Wilmington, Del., a corporation of Delaware No Drawing. Application March 9, 1945, Serial No. 581,927

5 Claims. (Cl. 260—464)

This application relates to the stabilization of organic compounds and particularly to the stabilization of cyanhydrins.

The cyanhydrins, which may be obtained for example by reacting aldehydes or ketones with hydrocyanic acid, are a reactive class of compounds which have been found useful in various chemical syntheses and as solvents for special uses. Potentially these compounds are also useful in other fields. However, a serious obstacle to the more general utilization of these compounds is a pronounced tendency on the part of most members of the class to decompose during storage or upon elevation to the higher temperatures necessary for distillation even under reduced pressure. It has been previously known that cyanhydrins can be stabilized in the liquid phase at ordinary temperatures by the use of sulfuric or phosphoric acids, but hitherto no means has been known for their stabilization at elevated temperatures or in the vapor phase. Thus, it has hitherto been impossible in many cases to recover cyanhydrins in a purified form, and in other cases where distillation under reduced pressure could be utilized, yields of purified product have been extremely low.

It is an object of this invention to provide a novel method for the stabilization of cyanhydrins. Another object is to provide a new method for the purification of these compounds. A further and specific object is to provide a method for the stabilization of cyanhydrins in the vapor phase. Another object is to provide a new stabilizer for cyanhydrins, which stabilizer is effective at elevated temperatures and in the vapor phase.

The above objects are attained in accordance with my invention by incorporating into a cyanhydrin elemental iodine.

I have discovered that when small amounts of iodine are added to cyanhydrins these compounds may be distilled with substantially less decomposition than is the case when no iodine is present. In some cases I have found that quantitative yields of purified cyanhydrins are obtained by distillation at atmospheric pressure, and in other cases, where distillation in the absence of a stabilizer may result in almost total decomposition of the cyanhydrin, even under very low pressures, the utilization of my invention makes possible high recoveries of cyanhydrins by distillation under reduced pressures.

I have discovered that in accordance with my invention effective stabilization in the vapor phase is due to the presence of elemental iodine. It is therefore necessary in utilizing my novel method either to remove from the cyanhydrin materials which react with iodine, to effectively neutralize such impurities, or to add iodine in sufficient excess to insure the presence of elemental iodine in the cyanhydrin being subjected to increased temperatures. Thus, for example, if the cyanhydrin contains alkali as an impurity, it is desirable to neutralize the impure cyanhydrin with an acid prior to the incorporation of iodine therein.

Various concentrations of iodine may be employed in accordance with my invention. In general, concentrations of 0.001 to 1.0 per cent iodine based on the weight of cyanhydrin present are sufficient for effective stabilization. In some cases traces of iodine are sufficient. However, it is generally impractical to attempt to utilize concentrations of less than 0.001 per cent iodine. Concentrations of iodine greater than 1.0 per cent may be utilized and will effectively stabilize the cyanhydrin, but I have found that there is usually no advantage in using concentrations greater than 1.0 per cent, except in cases where it may be desirable to utilize an excess of iodine in order to insure the presence of stabilizing amounts where iodine consuming impurities are present. I therefore prefer to utilize concentrations of elemental iodine within the range of 0.001 to 1.0 per cent based on the weight of the cyanhydrin. The following examples are illustrative of my invention:

*Example 1*

A sample of lactonitrile to which had been added 0.4 per cent iodine was distilled at atmospheric pressure. No appreciable decomposition occurred. Recovery of the cyanhydrin was nearly 100 per cent. A comparable sample of lactonitrile distilled in the absence of iodine yielded approximately 50 per cent of the original cyanhydrin, the remaining 50 per cent having decomposed during distillation.

*Example 2*

To a sample of mandelonitrile neutralized with phosphoric acid 0.2 per cent iodine was added. The mixture was then distilled under reduced pressure with no evidence of decomposition during distillation.

*Example 3*

A sample of formaldehyde cyanhydrin containing approximately 0.1 per cent iodine was distilled under vacuum with substantially no decomposition. In the absence of iodine this cyanhydrin decomposes completely during distillation under vacuum.

Example 4

A sample of acetone cyanhydrin containing approximately 0.1 per cent iodine was distilled at atmospheric pressure with no appreciable decomposition. Distillation of this cyanhydrin at atmospheric pressure in the absence of iodine results in almost complete decomposition.

Example 5

To a sample of acetophenone cyanhydrin neutralized with phosphoric acid a trace of iodine was added. The material was then distilled at 120° C. under a pressure of 5 mm. of mercury with no appreciable decomposition of the cyanhydrin.

Example 6

Acetoacetic ester cyanhydrin neutralized with phosphoric acid was stabilized by the addition of 0.14 per cent iodine. Upon distillation a quantitative yield of the cyanhydrin was obtained.

Example 7

Lactonitrile containing 0.25 per cent iodine was passed through a Pyrex glass tube heated to 400° C. at the rate of 1.0 cc. per minute. Lactonitrile was recovered in 59 per cent yield.

Lactonitrile containing no iodine was treated under identical conditions with a resultant yield of 31 per cent.

Illustrative of the cyanhydrins which may be effectively stabilized in accordance with my invention may be mentioned cyanhydrins of the following: acetaldehyde, benzaldehyde, acetone, acetophenone, acetoacetic ester, furfural, crotonaldehyde, diacetyl, veratraldehyde, vanillin, diacetone alcohol, methyl amyl ketone, aldol, piperonal, butyraldehyde, acetoin, mesityl oxide, acetyl acetone, methyl isopropyl ketone, acetonyl acetone.

The present invention is useful in the production of cyanhydrins, as it provides a means of stabilizing these compounds so that high yields may be obtained in the purification stage, and it is also generally useful in the production or utilization of cyanhydrins whenever it is necessary to heat these compounds substantially above room temperature.

I claim:

1. A new composition of matter comprising a cyanhydrin and 0.001 to 1.0 per cent of elemental iodine as stabilizer against thermal decomposition.

2. A new composition of matter comprising formaldehyde cyanhydrin and 0.001 to 1.0 per cent of elemental iodine as stabilizer against thermal decomposition.

3. A new composition of matter comprising acetone cyanhydrin and 0.001 to 1.0 per cent of elemental iodine as stabilizer against thermal decomposition.

4. A new composition of matter comprising lactonitrile and 0.001 to 1.0 per cent of elemental iodine as stabilizer against thermal decomposition.

5. The method for the purification of a cyanhydrin which comprises neutralizing the iodine consuming impurities contained therein, incorporating elemental iodine therein and distilling cyanhydrin from the resultant mixture.

VIRGIL L. HANSLEY.

REFERENCES CITED

The following references are of record in the file of this patent:

UNITED STATES PATENTS

| Number | Name | Date |
|---|---|---|
| 2,175,805 | Jacobson | Oct. 10, 1939 |